(12) United States Patent
Maharshak

(10) Patent No.: US 11,528,148 B1
(45) Date of Patent: Dec. 13, 2022

(54) INTERACTIVE VIDEOGAME VERIFICATION USING CRYPTOGRAPHICALLY PROTECTED TRANSACTION RECORDS

(71) Applicant: ELECTRONIC ARTS INC., Redwood City, CA (US)

(72) Inventor: Erez Maharshak, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 448 days.

(21) Appl. No.: 16/786,125

(22) Filed: Feb. 10, 2020

Related U.S. Application Data

(60) Provisional application No. 62/804,445, filed on Feb. 12, 2019.

(51) Int. Cl.
| | |
|---|---|
| *H04L 9/40* | (2022.01) |
| *H04L 9/32* | (2006.01) |
| *A63F 13/71* | (2014.01) |
| *H04L 9/00* | (2022.01) |

(52) U.S. Cl.
CPC .......... *H04L 9/3247* (2013.01); *A63F 13/71* (2014.09); *A63F 2300/532* (2013.01); *H04L 9/50* (2022.05)

(58) Field of Classification Search
CPC .......... H04L 9/3247; H04L 9/50; A63F 13/71; A63F 2300/532
See application file for complete search history.

(56) References Cited

U.S. PATENT DOCUMENTS

| | | | | |
|---|---|---|---|---|
| 10,373,158 | B1* | 8/2019 | James | G06Q 40/04 |
| 10,603,579 | B2* | 3/2020 | Pickover | A63F 13/212 |
| 10,810,167 | B1* | 10/2020 | Mahajan | H04L 9/0637 |
| 11,270,318 | B1* | 3/2022 | Schwarz | G06F 21/10 |
| 11,334,882 | B1* | 5/2022 | Jameson | G06Q 20/40145 |
| 2018/0054491 | A1* | 2/2018 | Mankovskii | H04L 67/142 |
| 2018/0322579 | A1* | 11/2018 | Macdonald | G06Q 40/06 |
| 2019/0130701 | A1* | 5/2019 | Simons | G07F 17/3251 |
| 2019/0205873 | A1* | 7/2019 | Kamalsky | G06Q 20/42 |
| 2019/0282906 | A1* | 9/2019 | Yong | G06Q 20/3825 |
| 2019/0314726 | A1* | 10/2019 | Masini | G07F 17/32 |

* cited by examiner

*Primary Examiner* — Ghodrat Jamshidi
(74) *Attorney, Agent, or Firm* — Lowenstein Sandler LLP

(57) ABSTRACT

An example method of performing interactive videogame verification using cryptographically protected transaction records includes: receiving, by a videogame server, from a first videogame client device, a first transaction record reflecting a first set of events associated with an interactive videogame session, wherein the first transaction record is cryptographically signed by a first private cryptographic key associated with the first videogame client device; receiving, from a second videogame client device, a second transaction record reflecting a second set of events associated with the interactive videogame session, wherein the second transaction record is cryptographically signed by a second private cryptographic key associated with the second videogame client device; and validating the first transaction record based on the second transaction record.

17 Claims, 8 Drawing Sheets

INTERACTIVE VIDEOGAME VERIFICATION USING CRYPTOGRAPHICALLY PROTECTED TRANSACTION RECORDS

REFERENCE TO RELATED APPLICATION

This application claims the benefit of U.S. Provisional Patent Application No. 62/804,445, filed Feb. 12, 2019, the entirety of which is incorporated herein by reference.

BACKGROUND

An interactive videogame may be implemented by a computer system (also referred to as a "gaming platform") which is programmed to generate video content based on a game scenario and user inputs received via a keyboard, a pointing device, and/or a game controller. The latter term refers to a specialized input device comprising various game control elements, such as buttons, joysticks, switches, levers, wheels, etc.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
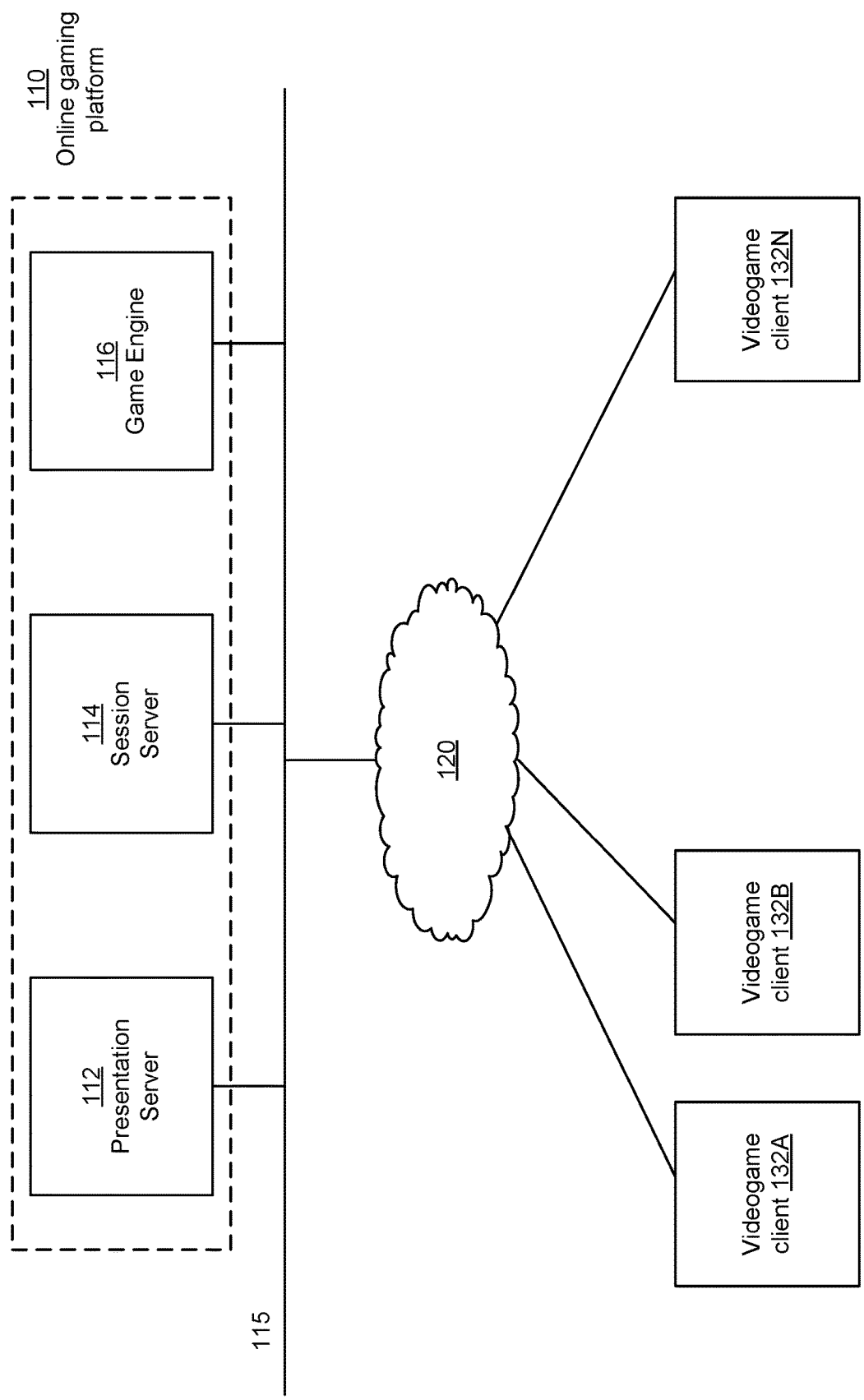
FIG. 1 schematically illustrates a high-level network diagram of an example distributed computer system operating in accordance with one or more aspects of the present disclosure.

Described herein are methods and systems for interactive videogame verification using cryptographically protected transaction records.

A session of an interactive videogame may be delivered to a videogame client device by an online gaming platform which may include one or more videogame servers accessible over a network (e.g., the Internet). The videogame client device may be provided by a specialized computing device (such as a game console) or a general purpose computing device (such as a personal computer, a tablet, or a smartphone). For improving the user's gaming experience, the videogame client device may be equipped with a peripheral device functioning as a game controller which may include a specialized input device that is specific for a particular game or a particular class of games (e.g., a steering wheel game controller for various automobile simulation games).

In an illustrative example, an interactive videogame may simulate a multiplayer sports game, in which users of two or more videogame client devices play against each other. Accordingly, a session of the interactive videogame may be played by two or more players connecting simultaneously to the videogame server, such that each player would use their respective videogame client device. In another illustrative example, two or more videogame client devices may establish peer-to-peer connections which do not involve the videogame server. The players may be located within the same room or may be geographically remote from each other. Once initiated by the videogame server, the session of the interactive videogame may be represented by a set of session states, such that each session state includes the values of a plurality of session state variables (e.g., positions and postures of one or more simulated game characters) and a plurality of session events (e.g., the values received from various input devices, such as a keyboard, a pointing device, or a game controller). Copies of the session state may be maintained by the videogame server and/or by each of the videogame client devices. Session events triggered by one of the videogame client devices may be sent by that videogame client device to the peer videogame client device(s) and to the videogame server. Each of the videogame client devices reports the session state to the videogame server at least once during the session (i.e., at the end of the session), and may additionally report, to the videogame server, certain intermediate session states. These intermediate session states may be reported periodically or responsive to an occurrence of a triggering event (such as a certain event in the simulated sports game, e.g., a goal in a game of soccer). The videogame server may evaluate the final session states (and optionally at least some of the intermediate session states) reported by the videogame client devices in order to determine the result of the session, identify the winner, and update the game scores associated with each of the players.

The above-described procedure of determining the gaming session outcome heavily relies upon the session states reported by the videogame client devices. Since each player has full control over their videogame client device, the integrity of the session may be compromised, e.g., by a malicious software agent running on the videogame client device and modifying the gaming session state before reporting the state to the videogame server (e.g., by directly modifying certain memory locations of the videogame client device).

The present disclosure provides systems and methods for interactive videogame verification using cryptographically protected transaction records. During the gaming session, each of the videogame clients may transmit, to the videogame server and/or to one or more peer videogame clients participating in the same gaming session, transaction records comprising session state variables (e.g., positions and postures of one or more simulated game characters) and session events (e.g., values received from various input devices, such as a keyboard, a pointing device, or a game controller).

Such transmissions may occur periodically or upon occurrence of certain triggering events (such as a certain event in the simulated sports game, e.g., a goal in a game of soccer). Before transmitting the transaction record, the videogame client may cryptographically sign it with its private cryptographic key.

Responsive to receiving a transaction record, a peer videogame client may decrypt the record using the public key of the record-originating client and validate the received transaction record by comparing, with its own session log, the session states and session events reflected by the received transaction record. Should the validation succeed, the peer videogame client may cryptographically sign the received transaction record by its private cryptographic key and transmit the double-signed (i.e., by both the transaction record-originating videogame client and its peer videogame client) transaction record to the videogame server. Otherwise, should the validation fail, the peer videogame client may notify the videogame server of the session state mismatch between the transaction-originating videogame client and the peer videogame client.

In certain implementations, the videogame client which has originated the transaction record and/or the peer videogame client which has received the transaction record may further append the transaction record to a cryptographically protected distributed ledger, such as a private or a public blockchain. In an illustrative example, the videogame client may further broadcast the cryptographically signed transaction records to the nodes of a private or a public blockchain, such that each node would append the record to the current data block of the local copy of the blockchain.

The videogame server may validate the transaction records received from the videogame clients and/or retrieved from a blockchain. In an illustrative example, each videogame client participating in the videogame session may transmit to the videogame server one or more transaction records cryptographically signed with the client's private cryptographic key. The videogame server may decrypt each transaction record using the public key of the videogame client that has produced the transaction record, and compare each event of a set of events reported by one videogame client to a respective event of a set of events reported by another videogame client which acts as the gaming session opponent of the first videogame client. Should the validation succeed, the videogame server may append the reported session states and events to the server copy of the session log. Otherwise, should the validation fail, the videogame server may terminate the videogame session and perform further remedial actions (e.g., excluding from the tournament one or more of the videogame clients that have produced conflicting transaction records). Similar validation methods may be implemented for multiplayer games, in which three or more videogame clients participate.

In another illustrative example, the videogame server may receive double-signed transaction records, such that each transaction record is cryptographically signed by the private cryptographic key of the videogame client that has originated the transaction record, and is further signed by the private cryptographic key of another videogame client which acts as the gaming session opponent of the first videogame client. Since the double-signed transaction records are originated by one videogame client and are validated by its gaming session opponent, the videogame server may, without additional validation, append the session states and events extracted from the transaction record to the server copy of the session log. Similar validation methods may be implemented for multiplayer games, in which three or more videogame clients participate.

At the end of the videogame session, the videogame server may analyze the validated videogame session states and events, determine the final state of the session (also referred to as the session result), identify the winner, and update the game scores associated with each of the players.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates a high-level network diagram of an example distributed computer system operating in accordance with one or more aspects of the present disclosure. Computing devices, appliances, and network segments are shown in FIG. 1 for illustrative purposes only and do not in any way limit the scope of the present disclosure. Various other computing devices, components, and appliances not shown in FIG. 1, and/or methods of their interconnection may be compatible with the methods and systems for interactive videogame verification using cryptographically protected transaction records described herein. Various functional or auxiliary network components (e.g., firewalls, load balancers, network switches, user directories, content repositories, etc.) may be omitted from FIG. 1 for clarity.

As shown in FIG. 1, the gaming platform 110 may include a presentation server 112, a session server 114 and a game engine 116 interconnected by the gaming service provider network 115. In certain implementations, each functional component of the gaming platform 110 may run on a dedicated computing device (e.g., a hardware server); alternatively, two or more functional components of the gaming platform 110 may be collocated on a single computing device or within a single virtualized execution environment, and/or a single functional component may be executed by two or more computing devices or two or more virtualized execution environments, such as virtual machines. In certain implementations, components of the gaming platform 110 may run in a private or public cloud.

A plurality of videogame client devices 132A-132N may connect to the gaming platform 110 via a network 120 (e.g., the Internet). A videogame client device 132 may be provided by a specialized computing device (such as a game console) or a general purpose computing device (such as a personal computer, a tablet, or a smartphone). The videogame client device 132 may run one or more pre-installed and/or dynamically downloadable gaming software modules employed to deliver the video game functionality to the end user, in accordance with one or more aspects of the present disclosure. In various illustrative examples, the videogame client device 132 may include one or more user interface devices, such as a touch screen, a video or still image camera, and/or a microphone. For improving the user's gaming experience, the videogame client device 132 may be equipped with a peripheral device functioning as a game controller, which may include a specialized input device that is specific for a particular game or a particular class of games (e.g., a steering wheel game controller for various automobile simulation games). In certain implementations, the videogame client device 132 may include a display which may be employed for displaying the interactive videogame content. Alternatively, a separate video display appliance in communication with the videogame client device 132 and the gaming platform 110 may be employed for displaying the interactive videogame content. Upon connecting to the gaming platform 110, the user may employ the videogame client device 132 to browse a game catalog, launch and play interactive video games, and perform various game-related transactions, as described in more details herein below.

While FIG. 1 illustrates multiple videogame client devices 132 connecting to the gaming platform 110, in various other illustrative examples, two or more videogame client devices may establish peer-to-peer connections which do not involve the videogame server. Accordingly, in certain implementations, at least some of the functions which are described herein as performed by the gaming platform 110 may be performed by one or more videogame client devices engaged in a videogame session.

Figure 2:
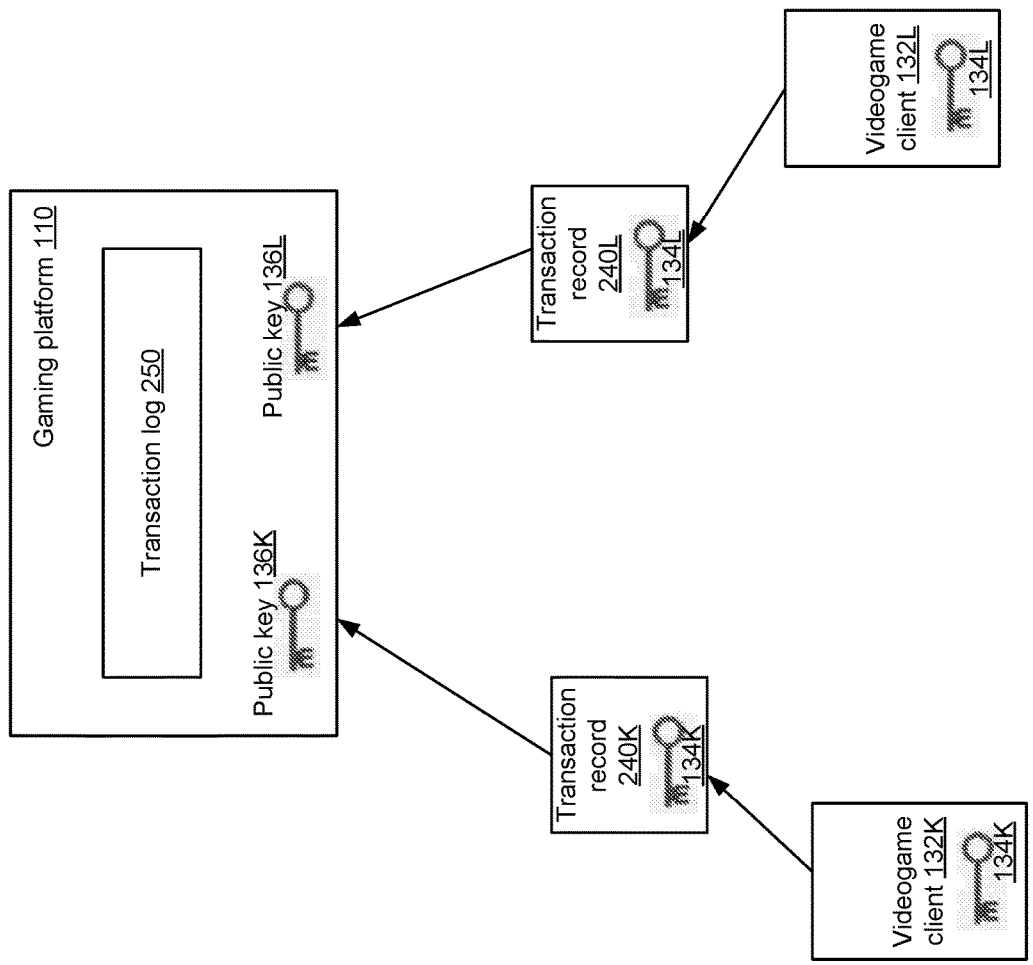
FIG. 2 schematically illustrates an example flow of interactions between videogame client devices and the gaming platform, in accordance with one or more aspects of the present disclosure.

As noted herein above, the gaming platform 110 may receive and validate the transaction records produced by the videogame clients 132A-132N. FIG. 2 schematically illustrates an example flow of interactions between videogame client devices and the online gaming platform, in accordance with one or more aspects of the present disclosure. As schematically illustrated by FIG. 2, a gaming session may be maintained by the gaming platform 110 for one or more videogame client devices 132A-132N. In course of the gaming session, each of the videogame client devices 132A-132N, such as the videogame client device 132K may transmit, to the gaming platform 110, one or more transaction records 240K, such that each transaction record is encrypted with the private key 134K that has been issued to the videogame client device 132K by the gaming platform 110 or by a public key infrastructure (PKI) certificate authority.

The transaction record 240K may include one or more gaming session states comprising session state variables (e.g., positions and postures of one or more simulated game characters) and session events (e.g., values received from various input devices, such as a keyboard, a pointing device, or a game controller). At least some of the events may be nondeterministic, e.g., may be generated by the videogame client 132K using one or more values derived from a random number generator or some other entropy pool. Session state transmissions by the online gaming clients 132A-132N to the gaming platform 110 may occur periodically or upon occurrence of certain triggering game-specific events (such as a certain event in the simulated sports game, e.g., a goal in a game of soccer).

The gaming platform 110 may receive and validate the transaction records 240A-240N produced by the videogame clients 132A-132N. Responsive to receiving each transaction record, e.g., the transaction record 240K, the gaming platform 110 may decrypt the transaction record using the public key 136K of the originating videogame client 132K, and compare each session state and/or each event of the transaction record 240K originated by the videogame client 132K to a respective session state and/or event of the transaction record 240L originated by reported by a peer videogame client 132L which acts as the gaming session opponent of first videogame client 132K. In an illustrative example, the validation succeeds if the ratio of the number of matching session states to the total number of the reported session states exceeds a predetermined threshold value, which may be less or equal to one. In an illustrative example, the validation succeeds if the ratio of the number of matching session events of a certain type to the total number of the reported session events of that type exceeds a predetermined threshold value, which may be less or equal to one.

Responsive to successfully validating the transaction record 240K reported by the videogame client 132K based on the transaction record 240L reported by the peer videogame client 132L, the gaming platform 110 may append the reported session states and events to the server copy of the session log 250. Otherwise, should the validation of the transaction record 240K fail, the gaming platform 110 may terminate the videogame session and perform further remedial actions (e.g., excluding from the tournament one or more of the videogame clients that have produced conflicting transaction records).

At the end of the videogame session, the videogame server may analyze the validated videogame session states and events stored in the session log 250 to determine the final state of the session (also referred to as the session result), identify the winner, and update the game scores associated with each of the players participating in the videogame session.

Figure 3:
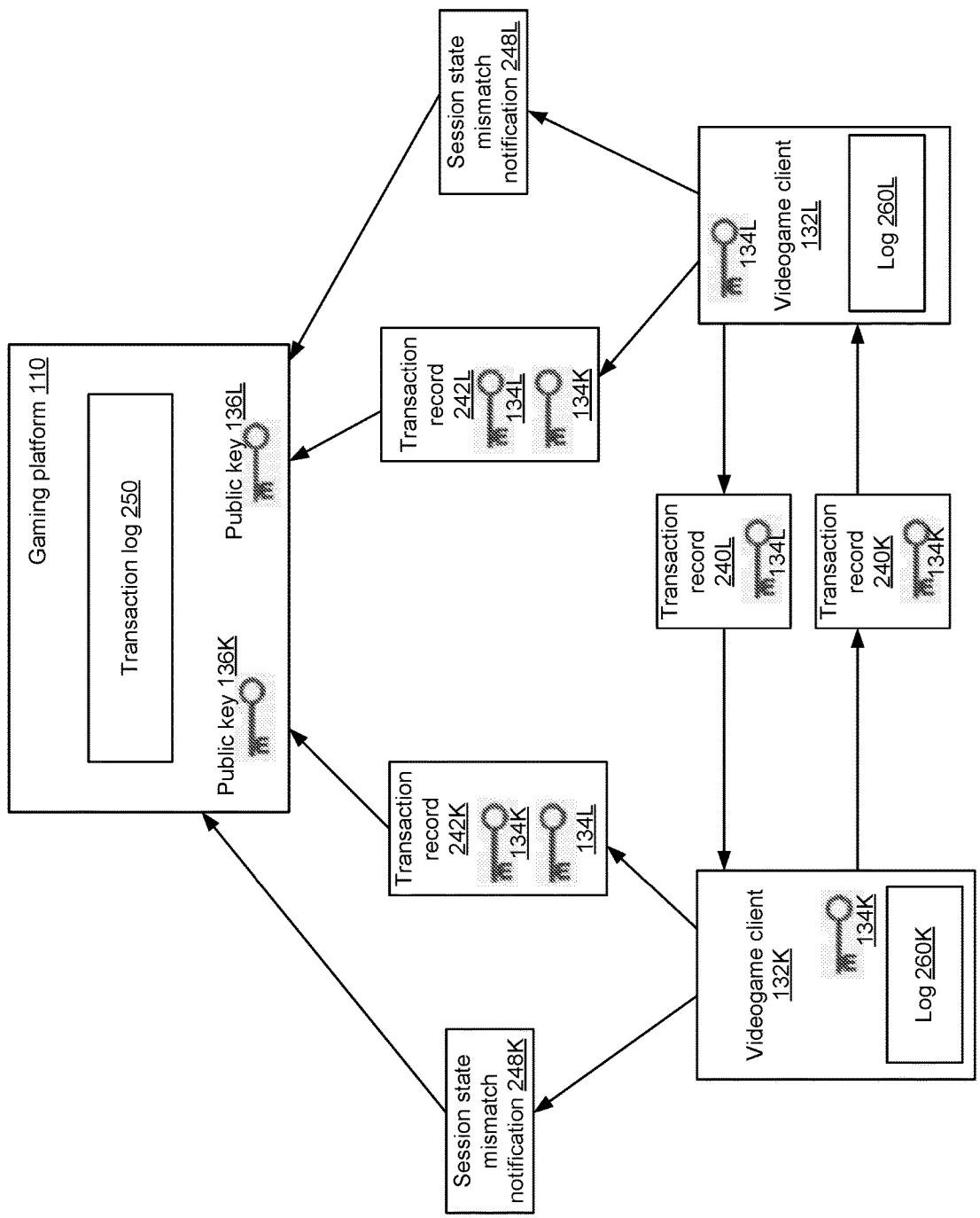
FIG. 3 schematically illustrates another example flow of interactions between videogame client devices and the gaming platform, in accordance with one or more aspects of the present disclosure.

In another illustrative example, the videogame server may receive double-signed transaction records, such that each transaction record is cryptographically signed by the private cryptographic key of the videogame client that has originated the transaction record, and is further signed by the private cryptographic key of another videogame client which acts as the gaming session opponent of the record-originating videogame client. FIG. 3 schematically illustrates an example flow of interactions between videogame client devices and the online gaming platform, in accordance with one or more aspects of the present disclosure. As schematically illustrated by FIG. 3, a gaming session may be maintained by the gaming platform 110 for one or more videogame client devices 132A-132N. In course of the gaming session, the videogame client device 132K may transmit, to one or more peer videogame client devices participating in the gaming session (e.g., the videogame client device 132L), one or more transaction records 240K, such that each transaction record is encrypted with the private key 134K that has been issued to the videogame client device 132K by the gaming platform 110 or by a PKI certificate authority.

Responsive to receiving the transaction record 240K, the peer videogame client 132L may decrypt the transaction record 240K using the public key 136K of the record-originating client 132K and validate the received transaction record 240K by comparing, with the local session log 260L, the session states and session events reflected by the received transaction record 240K. Should the validation succeed, the peer videogame client 132L may cryptographically sign the received transaction record 240K by own private cryptographic key 134L and transmit the double-signed (i.e., signed by the private cryptographic key 134K of the transaction-originating client 132K and by the private cryptographic key 134L of the transaction-forwarding client 132L) transaction record 242L to the gaming platform 110. Otherwise, should the validation fail, the peer videogame client 132L may transmit, to the gaming platform 110, a notification 248L of the session state mismatch between the transaction record-originating videogame client device 132K and the peer client device 132L.

Similarly, the videogame client device 132L may transmit, to one or more peer videogame client devices participating in the gaming session (e.g., the videogame client device 132K), one or more transaction records 240L, such that each transaction record is encrypted with the private key 134L that has been issued to the videogame client device 132L by the gaming platform 110 or by a PKI certificate authority. Responsive to receiving the transaction record 240L, the peer videogame client 132K may decrypt the transaction record 240L using the public key 136L of the record-originating client 132L and validate the received transaction record 240L by comparing, with the local session log 260K, the session states and session events reflected by the received transaction record 240L. Should the validation succeed, the peer videogame client 132K may cryptographically sign the received transaction record 240L by own private cryptographic key 134K and transmit the double-signed (i.e., signed by the private cryptographic key 134L of the transaction-originating client 132L and by the private cryptographic key 134K of the transaction-forwarding client 132K) transaction record 242K to the gaming platform 110. Otherwise, should the validation fail, the peer videogame client 132K may transmit, to the gaming platform 110, a notification 248K of the session state mismatch between the transaction record-originating videogame client device 132K and the peer client device 132L.

In certain implementations, the gaming platform 110 may cross-validate the transaction records 242K-242L produced by the videogame clients 132K-132L, as described in more detail herein above with references to FIG. 2. Alternatively, since the double-signed transaction records are originated by one videogame client and are validated by its gaming session opponent, the videogame server may omit any additional validation operations, and append the session states and events extracted from the double-signed transaction record 242L to the server copy of the session log 250, without validating the transaction record 242L against the transaction record 242K. Extracting the session states and events may involve decrypting the double-signed transaction records by sequentially performing decryption operations using the public keys of the respective videogame client devices. In an illustrative example, decrypting the double-signed transaction record 242L may involve the first decryption operation using the public cryptographic key 136L of the videogame client device 243L, thus producing the transaction record 240K which has been encrypted by the private key 134K of the originating videogame client device 132K. The transaction record 240 may then be decrypted using the public cryptographic key 136K of the videogame client device 132K.

In certain implementations, the videogame client 132K which has originated the transaction record 240K and/or the peer videogame client 132L which has received the transaction record 240L may further append the transaction record 240K to a cryptographically protected distributed ledger, such as a private or a public blockchain. In an illustrative example, the videogame clients 132K-132L may further broadcast the cryptographically-signed transaction record 240K to the nodes of a private or a public blockchain, such that each node would append the record to the current data block of the local copy of the blockchain.

A blockchain implements an immutable (append-only) database in which replicas of each transaction record, grouped in transaction blocks, are stored by multiple nodes. The transaction records stored on the blockchain may be cryptographically protected, e.g., by cryptographic private keys of the transaction initiating nodes. A consensus protocol may be implemented for the blockchain for validating transaction records by a majority of nodes, in order to enforce the transaction record immutability, thus making the blockchain an append-only data structure. In an illustrative example, the blockchain may implement a proof-of-work consensus protocol, which requires that a node, before broadcasting a block of transaction records, compute a value of a cryptographic nonce such that a certain hash function applied to the block would produce a pre-determined result. The significant computational complexity of this nonce computation operation makes it computationally infeasible for a majority of nodes to modify a previously issues transaction block.

Figure 4:
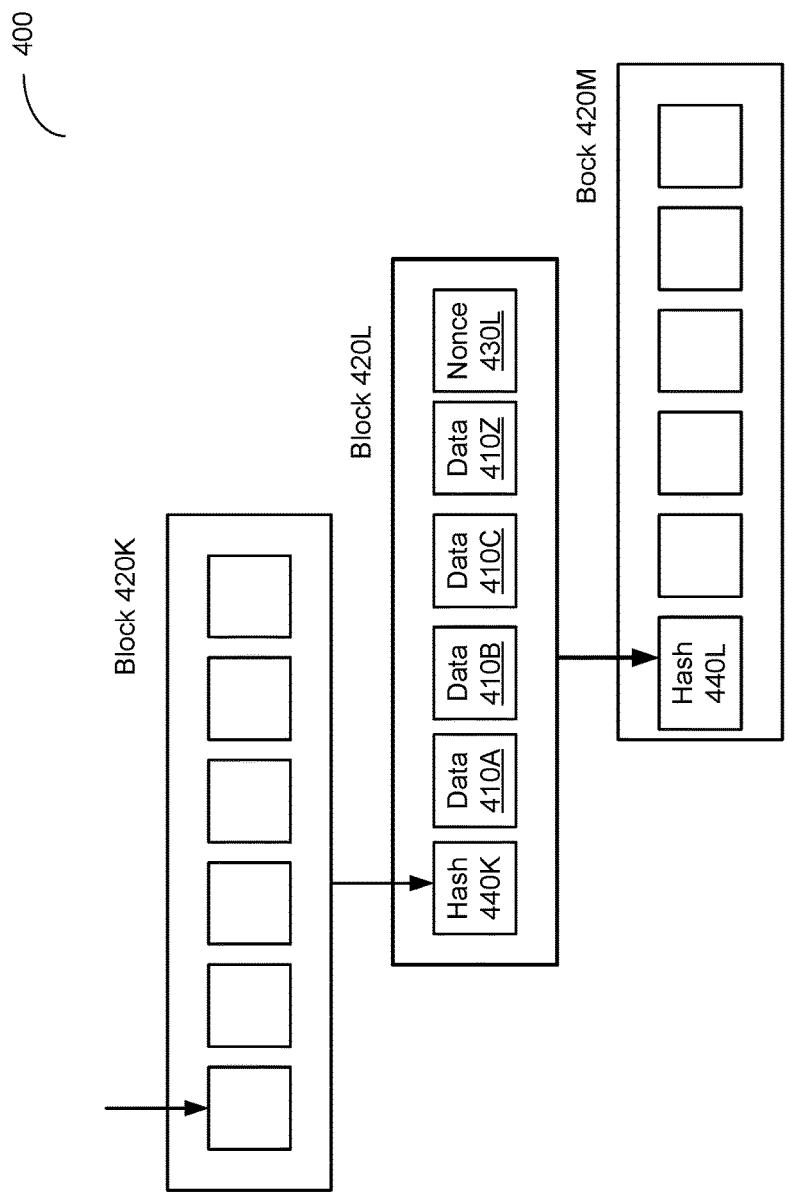
FIG. 4 schematically illustrates an example blockchain implementing a proof-of-work consensus protocol in accordance with one or more aspects of the present disclosure.

As schematically illustrated by FIG. 4, a node of the blockchain 400 may assemble one or more data items (e.g., transaction records comprising one or more session states and/or session events) 410A-410Z into a block, and may perform one or more cryptographic operations on the block to produce a cryptographically protected block 420L. In order to enforce the blockchain immutability, each block of the blockchain, e.g., the example block 420, includes a cryptographic hash 440K of the previous block (e.g., the block 420K) of the blockchain. In an illustrative example, cryptographically protecting a block may involve incrementing a nonce field 430L of the block 420L until a value of the nonce is found such that a cryptographic hash 440L of the block 420L would satisfy a pre-defined condition (e.g., comprise a pre-determined number of leading zero bits). The cryptographic hash may be represented by an irreversible function mapping a first bit sequence of arbitrary size to a second bit sequence of a pre-determined size, such that two different bit sequences are unlikely to produce the same hash value. The computations performed in order to cryptographically protect a block may be referred to as "proof-of-work." Upon producing the cryptographically protected block 420L, the node may broadcast the cryptographically protected block 420L to the peer nodes and save the node in the local persistent storage (e.g., the local transaction log).

In various other illustrative examples, other consensus protocols may be employed by systems and methods described herein. In order to address pertinent security and privacy requirements, systems and methods of the present disclosure may utilize private blockchains or permissioned public blockchains, and may further encrypt the transaction record data using secret cryptographic keys, as described in more detail herein below.

The gaming platform 110 may retrieve the transaction records from the cryptographically protected distributed ledger 400 and validate the retrieved transaction records as described in more detail herein above with references to FIGS. 2-3.

At the end of the videogame session, the gaming platform 110 may analyze the validated videogame session states and events stored in the session log 250 to determine the session result (e.g., by reconstructing at least a part of the videogame session based on the validated videogame session states and events), identify the winner, and update the game scores associated with each of the players participating in the videogame session.

Figure 5:
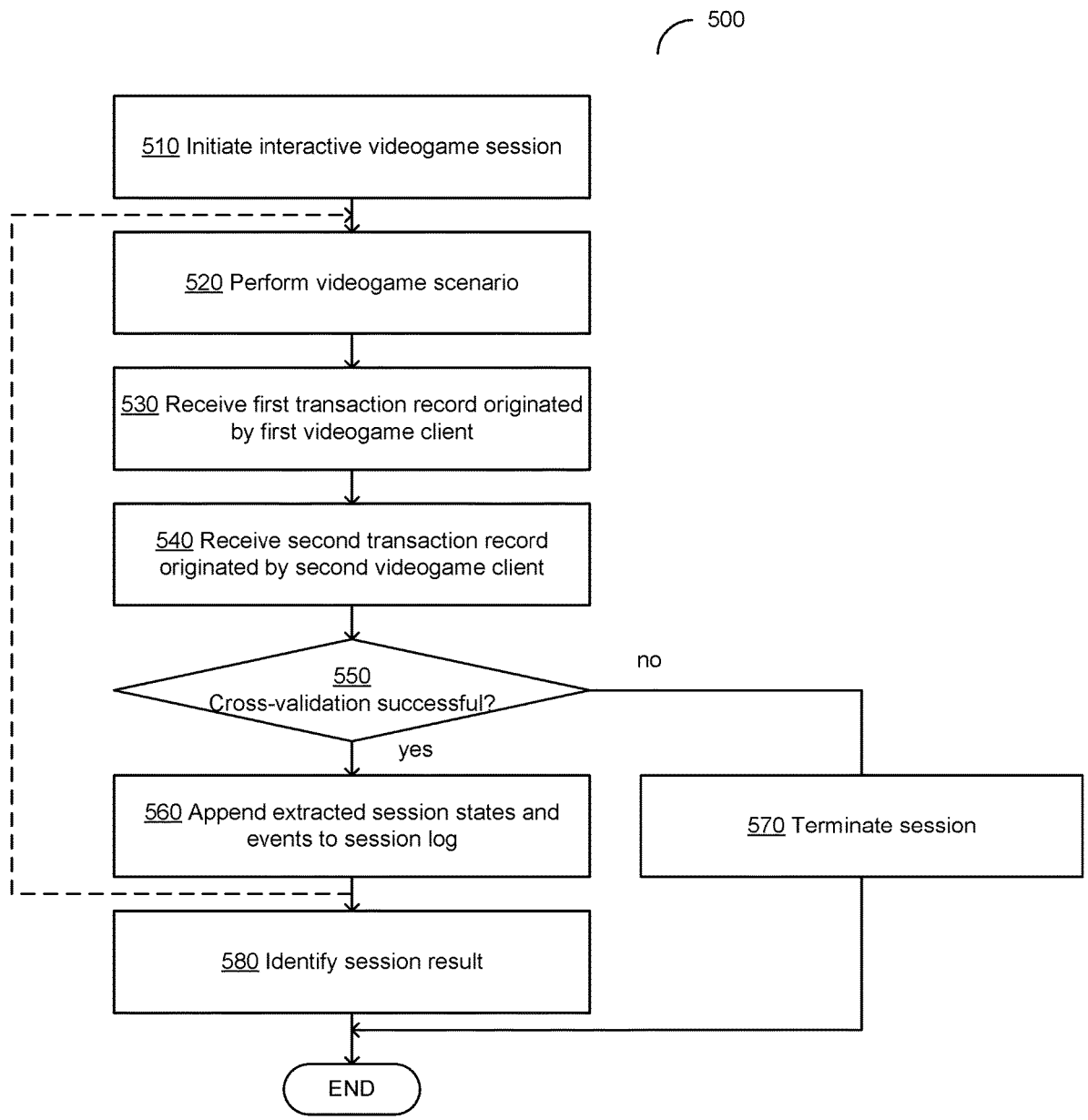
FIG. 5 depicts a flowchart of another example method for performing interactive videogame verification using cryptographically protected transaction records, in accordance with one or more aspects of the present disclosure.

FIG. 5 depicts a flowchart of an example method 500 for performing interactive videogame verification using cryptographically protected transaction records, in accordance with one or more aspects of the present disclosure. Method 500 and/or each of its individual functions, routines, subroutines, or operations may be performed by one or more processors of a videogame server (e.g., the gaming platform 110 of FIGS. 1-3) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders.

At block 510, the videogame server implementing the method may initiate a session of an interactive videogame to be played by two or more videogame client devices, as described in more detail herein above.

At block 520, the videogame server may perform at least a part of the interactive videogame scenario. This may include receiving session state updates from the videogame server, generating and rendering video content, and/or various other actions.

At block 530, the videogame server may receive the first transaction record originated by the first videogame client device participating in the videogame session. In an illustrative example, the videogame server may receive the first transaction record over a network connection from the first videogame client device. In an illustrative example, the videogame server may retrieve the first transaction record from a cryptographically protected distributed ledger. The first transaction record may comprise session state variables (e.g., positions and postures of one or more simulated game characters) and/or session events (e.g., values received from various input devices, such as a keyboard, a pointing device, or a game controller) of the videogame session. The first transaction record may be cryptographically signed by the private cryptographic key of the first videogame client device. In certain implementations, the first transaction record may be double-signed, i.e., by the private cryptographic key of the first videogame client device (transaction-originating client) and by the private cryptographic key of the second videogame client device (transaction-forwarding client), as described in more detail herein above.

At block 540, the videogame server may receive the second transaction record originated by the second videogame client device participating in the videogame session. In an illustrative example, the videogame server may receive the second transaction record over a network connection from the second videogame client device. In an illustrative example, the videogame server may retrieve the second transaction record from a cryptographically protected distributed ledger. The second transaction record may comprise session state variables and/or session events of the videogame session. The second transaction record may be cryptographically signed by the private cryptographic key of the second videogame client device. In certain implementations, the second transaction record may be double-signed, i.e., by the private cryptographic key of the second videogame client device (transaction-originating client) and by the private cryptographic key of the first videogame client device (transaction-forwarding client), as described in more detail herein above.

At block 550, the videogame server may cross-validate the first transaction record and the second transaction record. The validation may involve decrypting the first transaction record using the public key of the first videogame client, decrypting the second transaction record using the public key of the second videogame client, and comparing each session state and/or each event of the first transaction record to a respective session state and/or event of the second transaction record which acts as the gaming session opponent of first videogame client. For double-signed transaction records, the decryption may involve sequentially performing decryption operations using the public keys of the respective videogame client devices, as described in more detail herein above.

Responsive to successfully validating the transaction record at block 550, the videogame server may, at block 560, append, to the session log, the session states and session events extracted from the first transaction record and/or second transaction record. Otherwise, should the validation of the transaction record fail, the videogame server may, at block 570, terminate the videogame session and perform further remedial actions (e.g., excluding from the tournament one or more of the videogame clients that have produced conflicting transaction records), as described in more detail herein above.

Operations of blocks 520-560 may be repeated multiple times (as shown by the dashed line), until at least a part of the gaming session is completed.

At block 580, the videogame server may analyze the validated videogame session states and events stored in the session log to determine the session result (e.g., by reconstructing at least a part of the videogame session based on the validated videogame session states and events), identify the winner, and update the game scores associated with each of the players participating in the videogame session. Responsive to completing the operations of block 580, the method may terminate.

Figure 6:
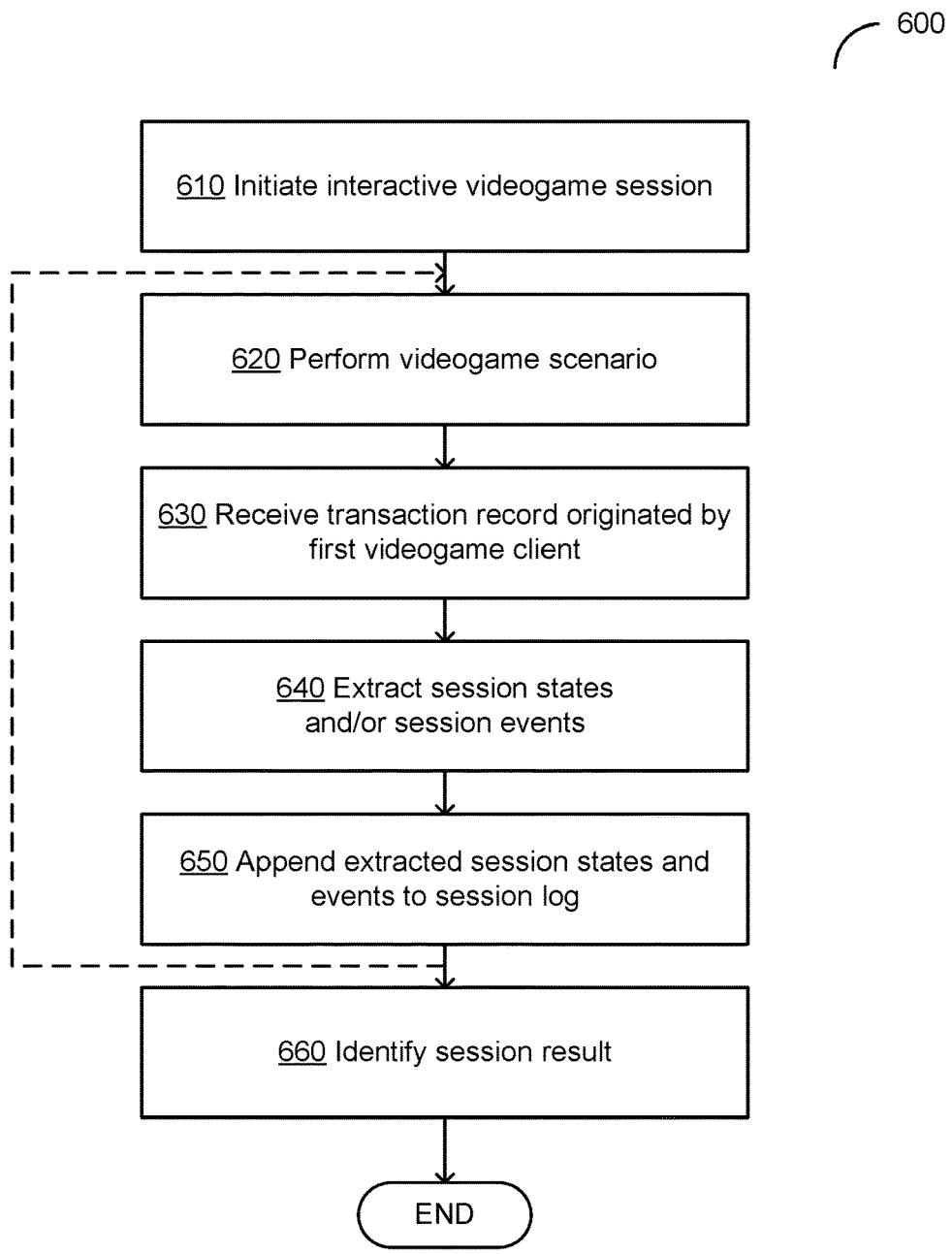
FIG. 6 depicts a flowchart of another example method for performing interactive videogame verification using cryptographically protected transaction records, in accordance with one or more aspects of the present disclosure.

FIG. 6 depicts a flowchart of another example method 600 for performing interactive videogame verification using cryptographically protected transaction records, in accordance with one or more aspects of the present disclosure. Method 600 and/or each of its individual functions, routines, subroutines, or operations may be performed by one or more processors of a videogame server (e.g., the gaming platform 110 of FIGS. 1-3) executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel and/or in arbitrary selected orders.

At block 610, the videogame server implementing the method may initiate a session of an interactive videogame to be played by two or more videogame client devices, as described in more detail herein above.

At block 620, the videogame server may perform at least a part of the interactive videogame scenario. This may include receiving session state updates from the videogame server, generating and rendering video content, and/or various other actions.

At block 630, the videogame server may receive a transaction record originated by the first videogame client device participating in the videogame session. In an illustrative example, the videogame server may receive the transaction record over a network connection from the second videogame client device. In an illustrative example, the videogame server may retrieve the transaction record from a cryptographically protected distributed ledger. The first transaction record may comprise session state variables (e.g., positions and postures of one or more simulated game characters) and/or session events (e.g., values received from various input devices, such as a keyboard, a pointing device, or a game controller) reported by the first videogame client device (transaction-originating client) and validated by the second videogame client device (transaction-forwarding client). The transaction record may be double-signed, i.e., by the private cryptographic key of the first videogame client device and by the private cryptographic key of the second videogame client device, as described in more detail herein above.

At block 640, the videogame server may extract the session states and/or session variables, which may involve decrypting the double-signed transaction records by sequentially performing decryption operations using the public keys of the respective videogame client devices. In an illustrative example, decrypting the double-signed transaction record may involve performing the first decryption operation using the public cryptographic key of the second videogame client device (transaction-forwarding client), thus producing the single-signed transaction record which has been encrypted by the private key of the first videogame client device (transaction-originating client). The single-signed transaction record may then be decrypted using the public cryptographic key of the first videogame client device.

At block 650, the videogame server may append the extracted session states and events to the session log. Operations of blocks 620-640 may be repeated multiple times (as shown by the dashed line), until at least a part of the gaming session is completed.

At block 660, the videogame server may analyze the validated videogame session states and events stored in the session log to determine the session result (e.g., by reconstructing at least a part of the videogame session based on the validated videogame session states and events), identify the winner, and update the game scores associated with each of the players participating in the videogame session. Responsive to completing the operations of block 660, the method may terminate.

Figure 7:
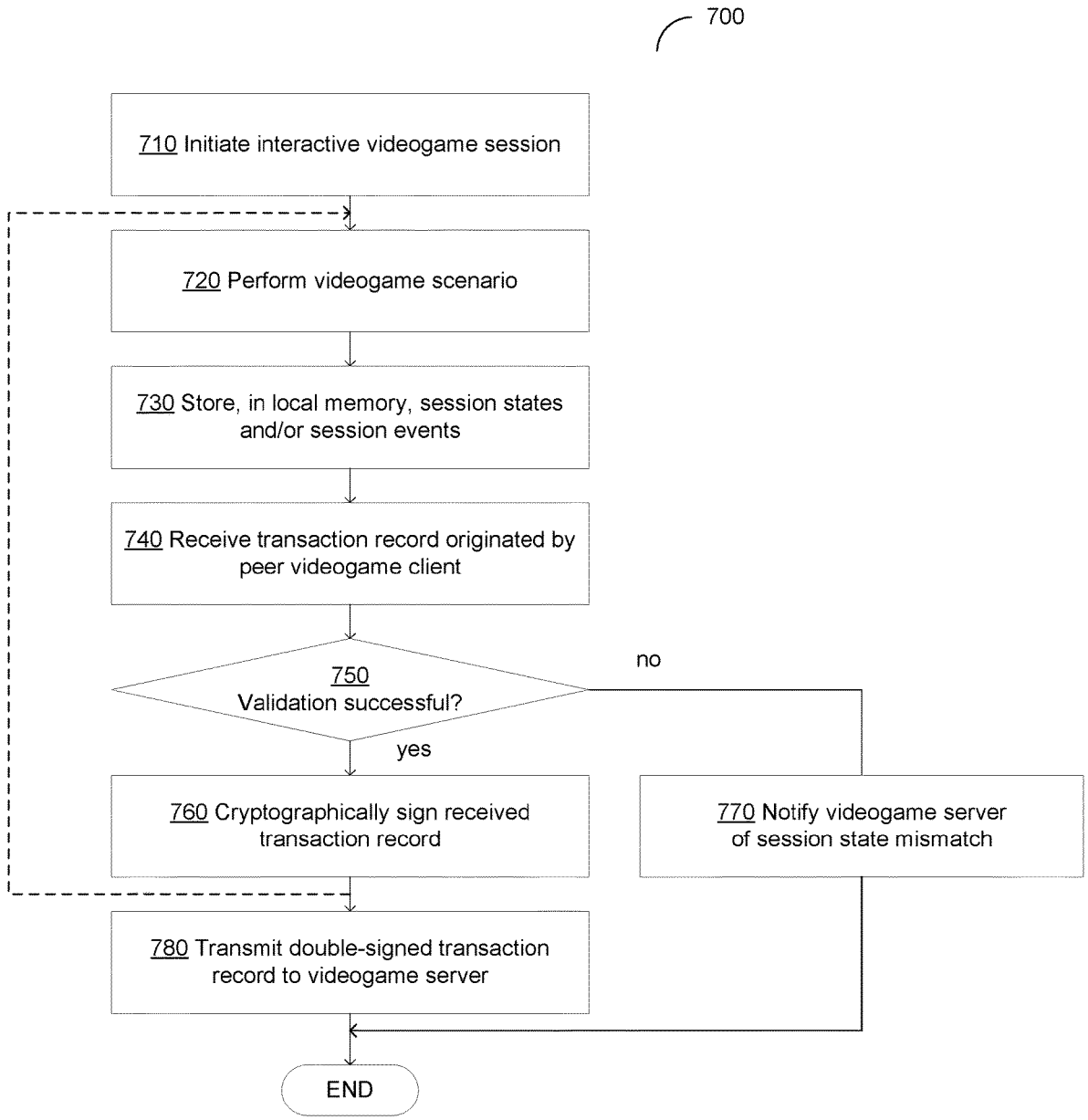
FIG. 7 depicts a flowchart of another example method for performing interactive videogame verification using cryptographically protected transaction records, in accordance with one or more aspects of the present disclosure.

FIG. 7 depicts a flowchart of another example method 700 for performing interactive videogame verification using cryptographically protected transaction records, in accordance with one or more aspects of the present disclosure. Method 700 and/or each of its individual functions, routines, subroutines, or operations may be performed by one or more processors of a videogame client device (e.g., the verifying videogame client device 132 of FIGS. 1-3) executing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel and/or in arbitrary selected orders.

At block 710, a videogame client device implementing the method may initiate a session of an interactive videogame (e.g., by transmitting a new session request to a videogame server), as described in more detail herein above.

At block 720, the active videogame client device may perform the interactive video game. This may include receiving game controller inputs, transmitting the inputs to the videogame server, receiving session state updates from the videogame server, generating and rendering video content, and/or various other actions.

At block 730, the videogame client device implementing the method may store, in the local memory, session state variables (e.g., positions and postures of one or more simulated game characters) and/or session events (e.g., values received from various input devices, such as a keyboard, a pointing device, or a game controller).

At block 740, the videogame client device may receive, from a peer videogame client device, a transaction record which may comprise session state variables and/or session events recorded by the peer videogame client device. The first transaction record may be cryptographically signed by the private cryptographic key if the peer videogame client device.

At block 750, the videogame client device may validate the received transaction record. The validation may involve decrypting the received transaction record using the public key of the peer videogame client, and comparing each session state and/or each event of the received transaction record to a respective session state and/or event stored in the local memory, as described in more detail herein above.

Responsive to successfully validating, at block 750, the received transaction record based on the stored session states and/or session events, the videogame client device may, at bock 760, cryptographically sign the received transaction record using a private cryptographic key. Otherwise, should the validation of the transaction record fail, the videogame client device may, at block 770, notify the videogame server of the session state mismatch between the videogame client device and the peer videogame client device, as described in more detail herein above.

At block 780, the videogame client device may transmit the double-signed transaction record to the videogame server, as described in more detail herein above.

Operations of blocks 720-760 may be repeated multiple times (as shown by the dashed line), until at least a part of the gaming session is completed. Responsive to completing the operations of block 760, the method may terminate.

Figure 8:
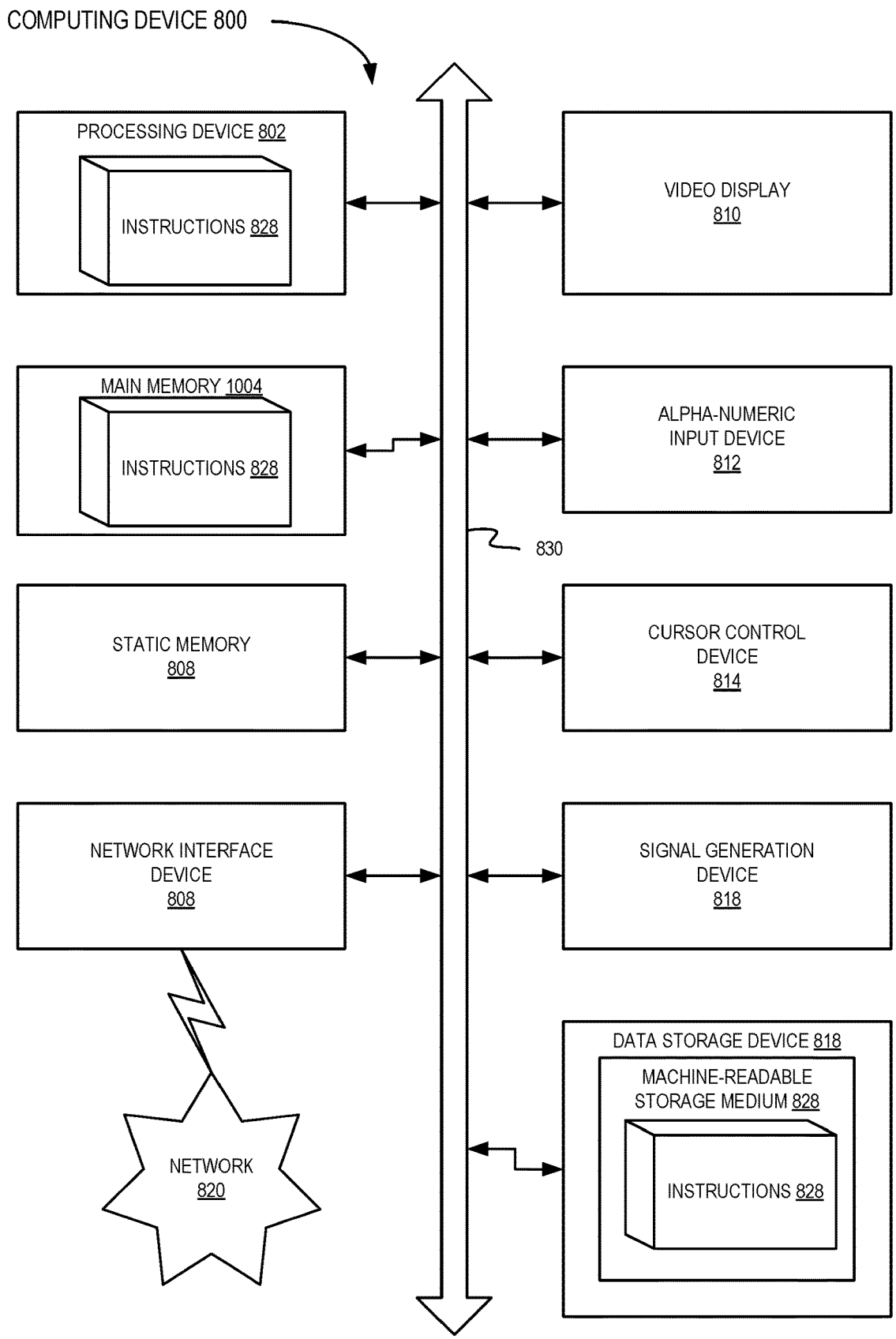
FIG. 8 illustrates a diagrammatic representation of a computing device which may implement the systems and methods described herein.

FIG. 8 illustrates a diagrammatic representation of a computing device 800 which may implement the systems and methods described herein. In various illustrative examples, computing device may implement various components of FIGS. 1-2, including components of the gaming platform 110, the active videogame client 132, or the verifying videogame client 232.

Computing device 800 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor) 802, a main memory 804 (e.g., synchronous dynamic random access memory (DRAM), read-only memory (ROM)), a static memory 808 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute module 828 implementing methods 500-700 for performing interactive videogame verification using cryptographically protected transaction records, in accordance with one or more aspects of the present disclosure.

Computing device 800 may further include a network interface device 808 which may communicate with a network 820. The computing device 800 also may include a video display unit 88 (e.g., a liquid crystal display (LCD) or a cathode ray tube (CRT)), an alphanumeric input device 812 (e.g., a keyboard), a cursor control device 814 (e.g., a mouse) and an acoustic signal generation device 818 (e.g., a speaker). In one embodiment, video display unit 88, alphanumeric input device 812, and cursor control device 814 may be combined into a single component or device (e.g., an LCD touch screen).

Data storage device 818 may include a computer-readable storage medium 824 on which may be stored one or more sets of instructions, e.g., instructions of module 828 implementing methods 500-700 for performing interactive videogame verification using cryptographically protected transaction records. Instructions implementing module 828 may also reside, completely or at least partially, within main memory 804 and/or within processing device 802 during execution thereof by computing device 800, main memory 804 and processing device 802 also constituting computer-readable media. The instructions may further be transmitted or received over a network 820 via network interface device 808.

While computer-readable storage medium 824 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   receiving, by a videogame server, from a first videogame client device, a first transaction record reflecting a first set of events associated with an interactive videogame session, wherein the first transaction record is cryptographically signed by a first private cryptographic key associated with the first videogame client device;
   receiving, from a second videogame client device, a second transaction record reflecting a second set of events associated with the interactive videogame session, wherein the second transaction record is cryptographically signed by a second private cryptographic key associated with the second videogame client device;
   decrypting the first transaction record using a first public key associated with the first videogame client device; and
   validating the first transaction record based on the second transaction record.

2. The method of claim 1, wherein an event of the first set of events comprises a value received by the first videogame client device from one of: a keyboard, a game controller, or a pointing device.

3. The method of claim 1, wherein an event of the set of events is represented by a game-specific nondeterministic event.

4. The method of claim 1, further comprising:
   responsive to successfully validating the first transaction record, determining a result of the interactive videogame session.

5. The method of claim 1, further comprising:
responsive to failing to successfully validate the first transaction record, terminating the interactive videogame session.

6. The method of claim 1, wherein validating the first transaction record further comprises:
comparing each event of the first set of events to a corresponding event of the second set of events.

7. The method of claim 1, wherein validating the first transaction record further comprises:
decrypting the first transaction record using a first public key associated with the first videogame client device.

8. A method, comprising:
retrieving, by a videogame server, from a cryptographically protected distributed ledger, a double-signed transaction record reflecting a set of events associated with an interactive videogame session, wherein the double-signed transaction record is cryptographically signed by a first private cryptographic key associated with a first videogame client device participating in the interactive videogame session and wherein the double-signed transaction record is further cryptographically signed by a second private cryptographic key associated with a second videogame client device participating in the interactive videogame session;
decrypting the double-signed transaction record to extract the set of events associated with the interactive videogame session; and
determining, based on the set of events associated with the interactive videogame session, a result of the videogame session.

9. The method of claim 8, wherein an event of the set of events comprises a value received by the first videogame client device from one of: a keyboard, a game controller, or a pointing device.

10. The method of claim 8, wherein an event of the set of events is represented by a game-specific nondeterministic event.

11. The method of claim 8, wherein decrypting the double-signed transaction record further comprises:
decrypting the double-signed transaction record using a second public cryptographic key associated with the second private cryptographic key to produce a single-signed transaction record; and
decrypting the single-signed transaction record using a first public cryptographic key associated with the first private cryptographic key.

12. The method of claim 8, wherein the double-signed transaction record is received from the second videogame client device.

13. A videogame client device, comprising:
a memory; and
a processing device operatively coupled to the memory, wherein the processing device is configured to:
store, in the memory, a first set of events associated with an interactive videogame session;
receive, from a peer videogame client device, a transaction record reflecting a second set of events associated with the interactive videogame session, wherein the transaction record is cryptographically signed by a second private cryptographic key associated with the peer videogame client device;
responsive to successfully validating the second transaction record based on the stored first set of events, cryptographically sign the transaction record using a private cryptographic key;
append the first set of events to a current data block of a cryptographically protected distributed ledger; and
transmit, to a videogame server, the cryptographically signed transaction record.

14. The videogame client device of claim 13, wherein an event of the first set of events comprises a value received by the videogame client device from one of: a keyboard, a game controller, or a pointing device.

15. The videogame client device of claim 13, wherein validating the transaction record further comprises:
decrypting the transaction record using a public key associated with the peer videogame client device.

16. The videogame client device of claim 13, wherein the processing device is further configured to:
responsive to failing to successfully validate the transaction record, notify the videogame server of a session state mismatch between the videogame client device and the peer videogame client device.

17. The videogame client device of claim 13, wherein the processing device is further configured to:
appending the first set of events to a cryptographically protected distributed ledger.

* * * * *